(12) United States Patent
Okawachi et al.

(10) Patent No.: US 12,091,500 B2
(45) Date of Patent: Sep. 17, 2024

(54) TACKIFIER FOR ADHESIVE COMPOSITION

(71) Applicant: LAWTER, INC., Chicago, IL (US)

(72) Inventors: Keijirou Okawachi, Kallo (BE);
Hironori Matsushima, Kallo (BE);
John Hazen, Spaubeek (NL); Wietze Bakker, Hoensbroek (NL);
Massimiliano Giacomelli Penon, Maastricht (NL)

(73) Assignee: LAWTER, INC., Chicago, IL (US)

( * ) Notice: Subject to any disclaimer, the term of this patent is extended or adjusted under 35 U.S.C. 154(b) by 0 days.

(21) Appl. No.: 18/557,732

(22) PCT Filed: Apr. 25, 2022

(86) PCT No.: PCT/US2022/026112
§ 371 (c)(1),
(2) Date: Oct. 27, 2023

(87) PCT Pub. No.: WO2022/232009
PCT Pub. Date: Nov. 3, 2022

(65) Prior Publication Data
US 2024/0228697 A1    Jul. 11, 2024

(30) Foreign Application Priority Data

Apr. 28, 2021 (EP) ................... 21170900

(51) Int. Cl.
*C08G 63/19* (2006.01)
*C08G 63/199* (2006.01)
*C09J 11/08* (2006.01)

(52) U.S. Cl.
CPC ............ *C08G 63/199* (2013.01); *C09J 11/08* (2013.01); *C08G 2170/00* (2013.01); *C09J 2433/00* (2013.01)

(58) Field of Classification Search
CPC .... C09J 2433/00; C09J 11/08; C08F 2170/00; C08G 63/199
See application file for complete search history.

(56) References Cited

U.S. PATENT DOCUMENTS

| | | |
|---|---|---|
| 5,097,006 A | 3/1992 | Kapilow et al. |
| 6,653,398 B2 * | 11/2003 | Hazen .............. C08G 63/48 524/270 |
| 6,989,413 B2 * | 1/2006 | Hazen .............. C08G 63/48 524/270 |
| 2005/0182150 A1 | 8/2005 | Bamborough et al. |

FOREIGN PATENT DOCUMENTS

| | | |
|---|---|---|
| EP | 3760679 A1 | 6/2021 |
| JP | 2011225748 A | 11/2011 |
| JP | 2011225751 A | 11/2011 |
| WO | 0160939 A1 | 8/2001 |

* cited by examiner

*Primary Examiner* — Sanza L. McClendon
(74) *Attorney, Agent, or Firm* — Hudak, Shunk & Farine Co. LPA

(57) ABSTRACT

The invention relates to use of a polyester comprising monomer repeating units from (A) a hydrogenated bisphenol, (B) a diol, (C) a dicarboxylic acid or its anhydride as a tackifier of an adhesive composition, wherein (C) comprises (C1) an aliphatic dicarboxylic acid or its anhydride.

21 Claims, 3 Drawing Sheets

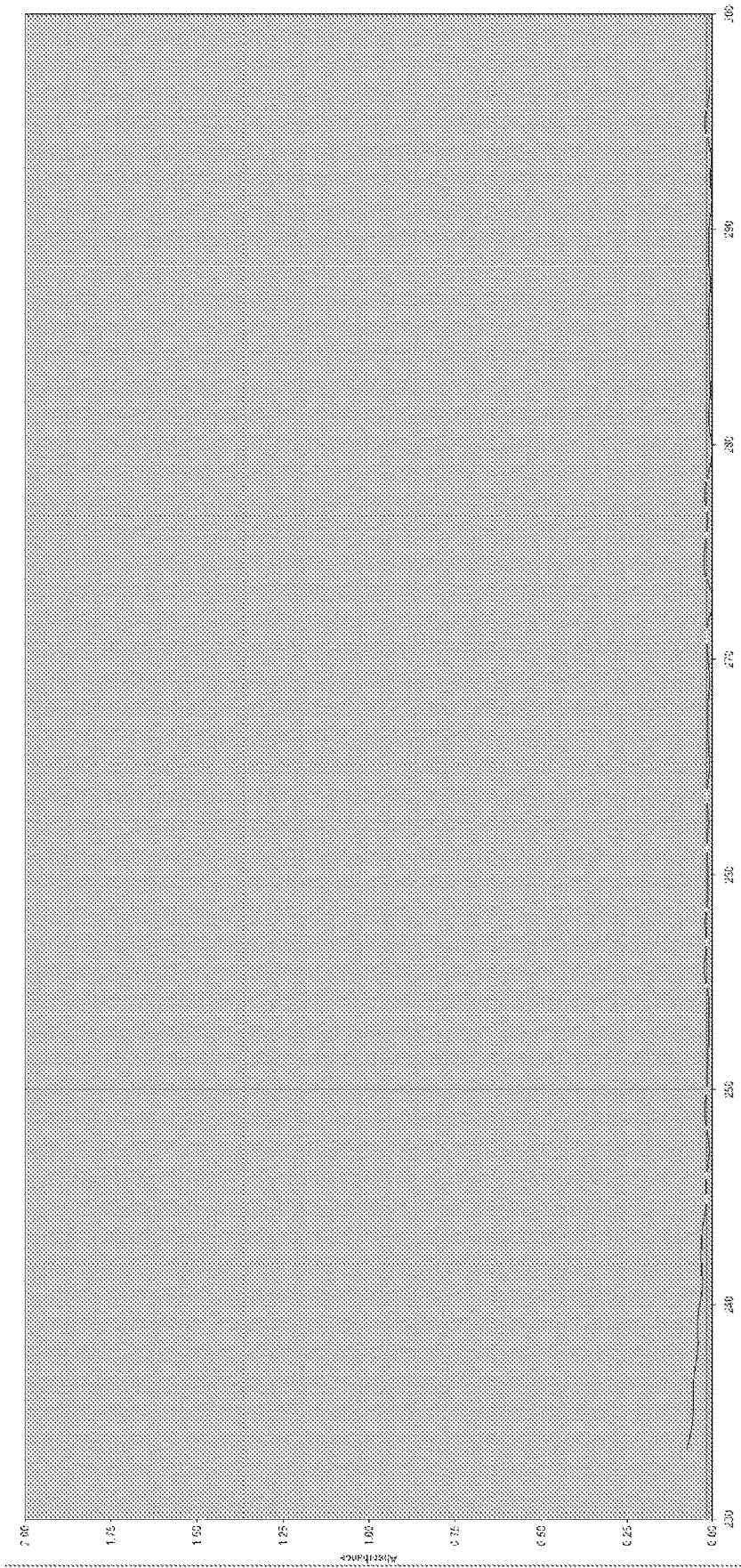
Figure 1(a): x-axis is Wavelength (nm) from 230 to 300; y-axis is Absorbance from 0.00 to 2.00

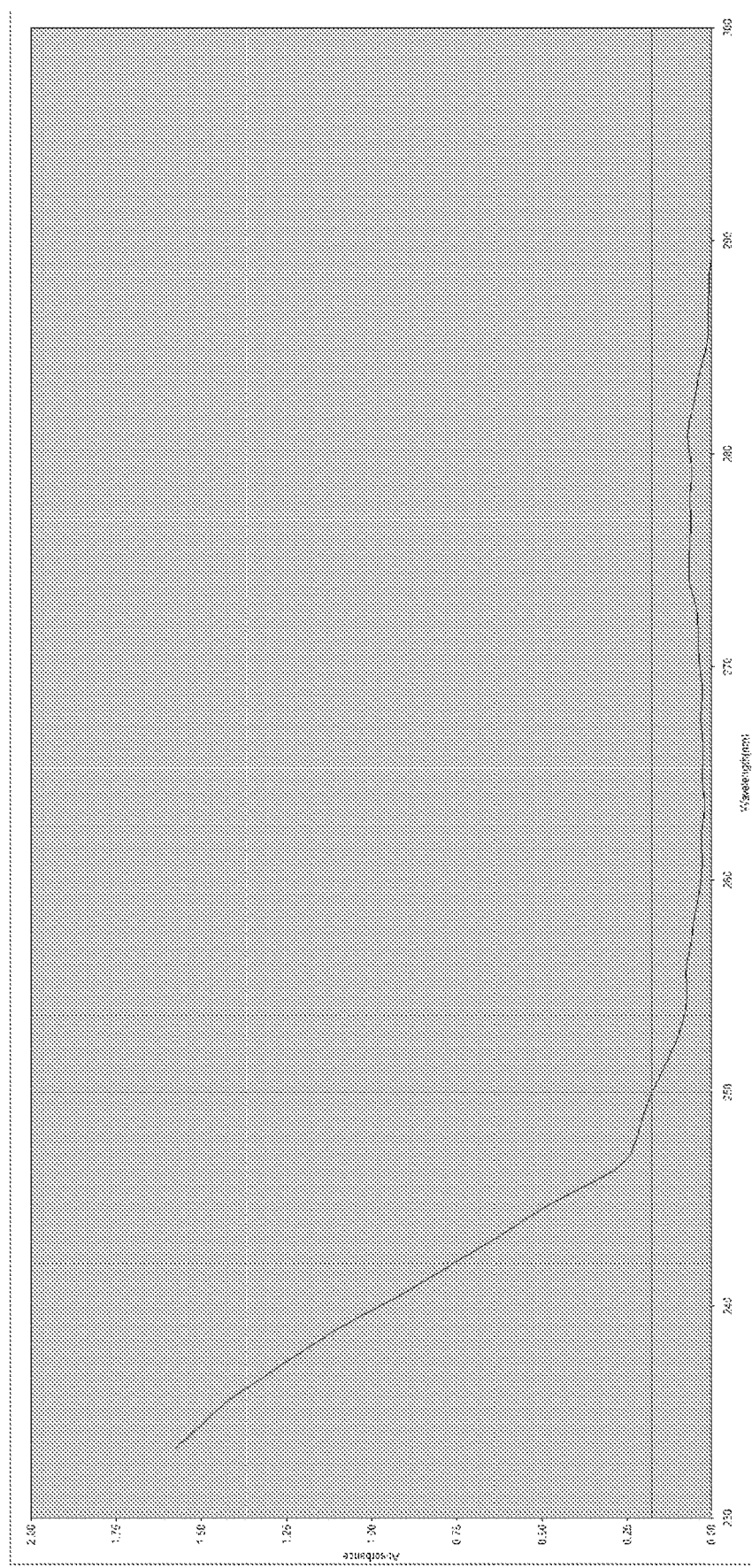
Figure 1(b): x-axis is Wavelength (nm) from 230 to 300; y-axis is Absorbance from 0.00 to 2.00

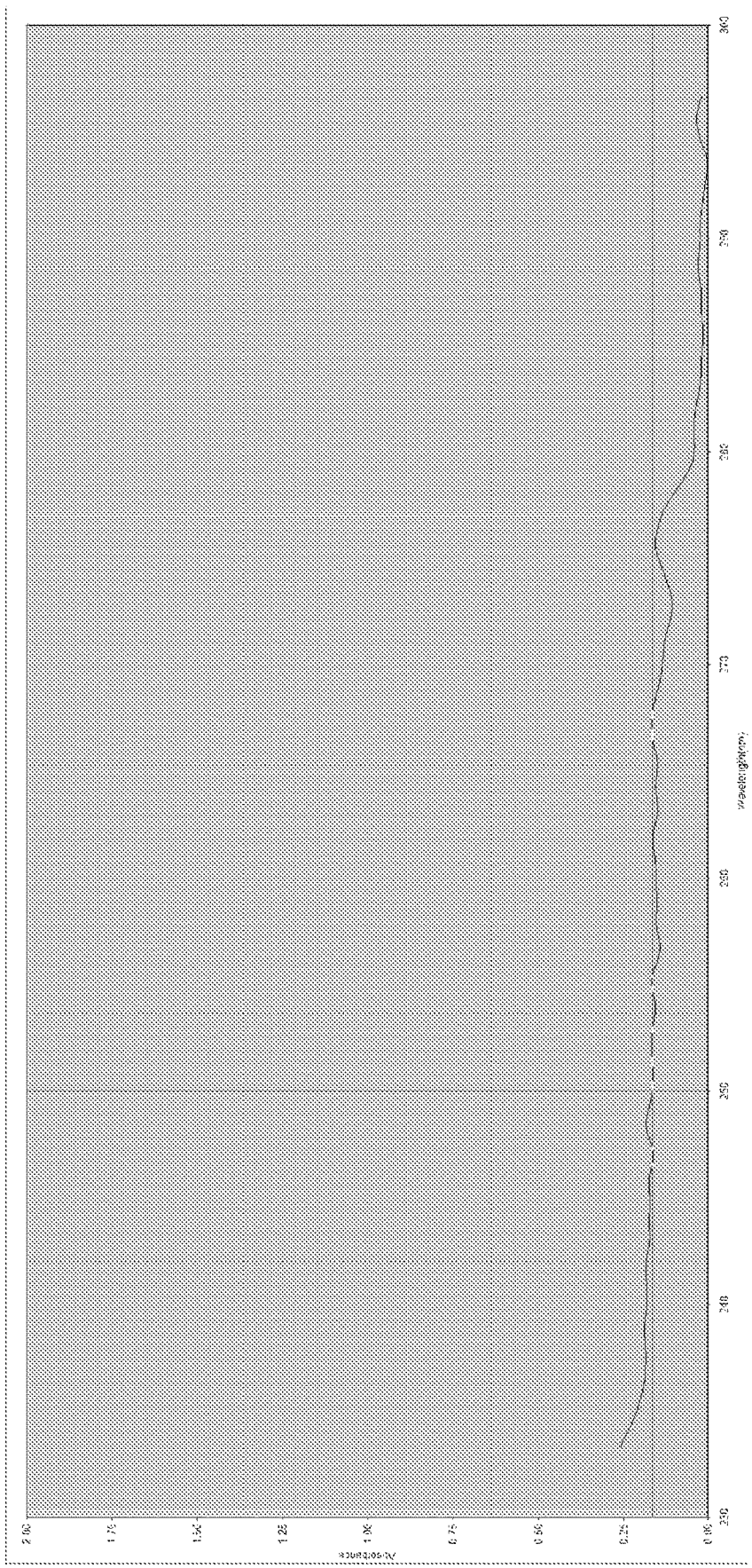
Figure 1(c): x-axis is Wavelength (nm) from 230 to 300; y-axis is Absorbance from 0.00 to 2.00

TACKIFIER FOR ADHESIVE COMPOSITION

FIELD OF THE INVENTION

The present invention relates to use of a polyester as a tackifier of a radiation curable adhesive composition. The present invention further relates to a radiation curable adhesive composition comprising such tackifier and a radiation-curable composition. The present invention further relates to an article comprising parts adhered to each other by the adhesive composition.

BACKGROUND OF THE INVENTION

Use of a tackifier in an adhesive composition is known. Examples of known tackifiers include rosins, rosin esters, hydrogenated rosin esters, pure monomer resins, styrene-based resins, and hydrogenated hydrocarbon resins.

US2005/0182150 discloses a radiation-curable adhesive composition comprising at least one tackifier resin and at least one radiation-curable composition. The tackifier resin comprises monomer repeating units from at least one aromatic monomer and at least one acrylate monomer, more specifically may comprise repeating units from at least one monomer selected from styrene, acrylic acid, and 2-ethylhexyl acrylate. According to US2005/0182150, the problem of rosins that they are skin sensitizers is solved by the tackifier resin described. However, according to the examples of US2005/0182150 (Tables 6 and 10.1), the tackifier resin gives a peel adhesion and a loop tack to an adhesive composition comparable to a rosin and has a higher UV radiation absorption at the curing wave length than a rosin.

There is still a need in the art for a tackifier which gives good adhesion properties to an adhesive composition, which preferably has a low UV radiation absorption and which preferably is not a skin sensitizer. It is also desirable that the tackifier has a good compatibility with the radiation-curable composition in the adhesive composition.

SUMMARY OF THE INVENTION

It is an objective of the present to provide a tackifier in which the above-mentioned and/or other needs are met.

Accordingly, the present invention provides use of a polyester comprising monomer repeating units from (A) a hydrogenated bisphenol, (B) a diol and (C) a dicarboxylic acid or its anhydride as a tackifier of a radiation curable adhesive composition, wherein (C) comprises (C1) an aliphatic dicarboxylic acid or its anhydride.

The present invention further provides a radiation-curable adhesive composition comprising a tackifier and a radiation-curable composition, wherein the tackifier comprises or is a polyester comprising monomer repeating units from (A) a hydrogenated bisphenol, (B) a diol and (C) a dicarboxylic acid or its anhydride, wherein (C) comprises (C1) an aliphatic dicarboxylic acid or its anhydride.

The polyester used in the present invention as a tackifier gives good adhesion properties to an adhesive composition, has a low UV radiation absorption and is not a skin sensitizer.

It is noted that JP2011225751 discloses a similar polyester. However, JP2011225751 relates to an ink comprising 10-40 wt. % of a polyester, 30-75 wt. % of a UV curable compound and 5-15 wt. % of an initiator and not an adhesive composition. Suitable examples of (A) a hydrogenated bisphenol, (B) a diol and (C) a dicarboxylic acid or its anhydride used in the present invention are mentioned in JP2011225751, incorporated herein by reference.

It will be appreciated by the skilled person that an adhesive composition is different from an ink. An ink requires colorants and is not optically clear. The adhesive composition according to the invention is optically clear. As used herein, the term "optically clear" may refer to a material that has a luminous transmission of at least 80% and particularly at least 90% and a haze of at most 5% and particularly at most 2% in the wavelength range of 400 to 700 nm. The luminous transmission and the haze can be determined using, for example, ASTM-D 1003-95. It may also be defined by an opacity of at most 1% in the wavelength range of 400 to 700 nm as determined by ASTM-D 1003-95. The adhesive composition according to the invention may also be defined by it being substantially free of colorants, i.e. the adhesive composition comprises at most 0.1 wt. % or 0 wt. % of colorants.

The term "tackifier" as used herein means a composition which is useful to impart tack to an adhesive composition or to increase tack to a predetermined desired level, or modify peel adhesion. ASTM D-1878-1T defines tack as "the property of a material which enables it to form a bond of measurable strength immediately on contact with another surface".

The term "radiation-curable composition" as used herein means a composition which is curable upon exposure to actinic and/or ionizing radiation. The term "radiation" is used herein to include actinic radiation such as ultraviolet radiation and ionizing radiation created by the emission of electrons or highly accelerated nuclear particles such as neutrons, alpha-particles etc.

BRIEF DESCRIPTION OF THE DRAWINGS

FIG. 1(a) is a graph, wherein the x-axis is wavelength (nm) from 230 to 300 and the y-axis is absorbance from 0.00 to 2.00;

FIG. 1(b) is a graph, wherein the x-axis is wavelength (nm) from 230 to 300 and the y-axis is absorbance from 0.00 to 2.00; and FIG. 1 (c) is a graph, wherein the x-axis is wavelength (nm) from 230 to 300 and the y-axis is absorbance from 0.00 to 2.00.

DETAILED DESCRIPTION OF THE INVENTION (A) Hydrogenated Bisphenol

Suitable examples of the hydrogenated bisphenol include hydrides of Bisphenol A (2,2-bis (4-hydroxyphenyl) propane), Bisphenol F (bis (hydroxyphenyl) methane), Bisphenol E (2,2-bis (4-hydroxyphenyl) ethane), Bisphenol B (2,2-bis (4-hydroxyphenyl) butane), Bisphenol S (bis (4-hydroxyphenyl) sulfone), 2,2-Bis (4-hydroxyphenyl)-4-methylpentane, 1,1-bis (4-hydroxyphenyl)-2-methylpropane, Bis (4-hydroxyphenyl) phenylmethane, Bis (4-hydroxy-3,5-dimethylphenyl) methane, 1,1-bis (4-hydroxy-3,5-dimethylphenyl) ethane, 2,2-bis (4-hydroxy-3,5-dimethylphenyl) propane, 2,2-bis (4-hydroxy-3,5-dimethylphenyl) butane, 2,2-Bis (4-hydroxy-3-methylphenyl) butane, 1,1-bis (4-hydroxy-3-methylphenyl)-2-phenylethane, Biphenol, Bis (4-hydroxyphenyl) ether and Bis (4-hydroxyphenyl) ketone.

Further suitable examples of the hydrogenated bisphenol include ethylene oxide and propylene oxide adducts of the examples of the hydrogenated bisphenol mentioned herein.

Preferably, the hydrogenated bisphenol is a hydride of bisphenol A (2,2-bis (4-hydroxyphenyl) propane).

Preferably, the amount of (A) in the polyester is 10 to 50 wt. %, preferably 25 to 40 wt. % with respect to the polyester.

(B) Diol

Preferably, the diol is a diol having a branched alkyl group or an ether group.

Suitable examples of the diol having a branched alkyl group include 2,2-dimethylpropane-1,3-diol (neopentyl glycol), 2-methyl-2,4-pentanediol, 3-methyl-1,5-pentanediol, 2-methyl-2-propyl-1,3-propanediol, 2,4-dimethyl-2,4-dimethylpentanediol, 2,2-diethyl-1,3-propanediol, 2,2,4-trimethyl-1,3-pentanediol, dimethylol octane, 2-ethyl-1,3-hexanediol, 2,5-Diol-2,5-hexanediol, 2-methyl-1,8-octanediol, 2-butyl-2-ethyl-1,3-propanediol and 2,4-diethyl-1,5-pentanediol.

Suitable examples of the diol having an ether group include polyether polyol such as polyethylene glycol (n=1 to 20), polypropylene glycol (n=1 to 20), polytetramethylene glycol (n=1 to 20), and polyester polyol.

Preferably, the diol is neopentyl glycol.

Preferably, the amount of (B) in the polyester is 10 to 50 wt. %, preferably 10 to 35 wt. %, with respect to the polyester.

Preferably, the amount of (B) in the polyester is smaller than the amount of (A) in the polyester.

(C) Dicarboxylic Acid or its Anhydride

The dicarboxylic acid or its anhydride comprises (C1) an aliphatic dicarboxylic acid or its anhydride.

Preferably, (C1) contains a cyclohexene or cyclohexane structure.

Suitable examples of (C1) include 1,2,3,6-tetrahydrophthalic acid, 3-methyl-1,2,3,6-tetrahydrophthalic acid, 4-methyl-1,2,3,6-tetrahydrophthalic acid, hexahydrophthalic acid, 3-Methylhexahydrophthalic acid and 4-methylhexahydrophthalic acid their anhydrides.

Preferably, (C1) is 1,2,3,6-tetrahydrophthalic acid.

Preferably, (C) consists of (C1). Alternatively, (C1) may further comprise (C2) an aromatic dicarboxylic acid or its anhydride, such as phthalic anhydride. It was found that the presence of (C2) leads to lower adhesion properties as well as a higher UV radiation absorption at the curing wave length.

The amount of (C1) with respect to (C) may be less than 50 wt. %, e.g. less than 50 wt. % and at least 10 wt. %, at least 20 wt. %, at least 30 wt. % or at least 40 wt. %. Preferably, however, the amount of (C1) with respect to (C) is at least 50 wt. %, at least 60 wt. %, at least 70 wt. %, at least 80 wt. %, at least 90 wt. %, at least 95 wt. %, at least 99 wt. % or 100 wt. % Preferably, the amount of (C2) with respect to (C) is less than 50 wt. %, less than 40 wt. %, less than 30 wt. %, less than 20 wt. %, less than 10 wt %, less than 5 wt. % or less than 1 wt. %.

Preferably, the amount of (C) in the polyester is 20 to 60 wt. %, preferably 30 to 50 wt. % with respect to the polyester.

Preferably, the weight amount of (C) in the polyester is larger than the weight amount of (A) in the polyester. Preferably, the weight amount of (C) in the polyester is larger than the weight amount of (B) in the polyester. Preferably, the weight amount of (C) in the polyester is smaller than the total of the weight amount of (A) in the polyester and the weight amount of (B) in the polyester.

Preferably, the amount of (A) with respect to the total amount of (A) and (C) is 30 to 80 wt. %, more preferably 35 to 75 wt. %.

Preferably, the amount of (A) with respect to the total of (A) and (B) is at most 70 wt. %, more preferably 30 to 65 wt. %. This leads to a particularly good compatibility with other components in the adhesive composition.

Preferably, the amount of (A) with respect to the total of (A) and (B) is at least 40 wt %. This leads to a high adhesive property of the adhesive composition.

Other Compounds for Preparing Polyester

The polyester used according to the invention may consist of monomer repeating units from (A), (B) and (C). Alternatively, the polyester used according to the invention may further comprise monomer repeating units from compounds different from (A), (B) or (C). Preferably, the total of the amounts of (A), (B) and (C) is 90 to 100 mol % of the polyester.

It will be appreciated that the amount of (A), (B), (C) in the polyester means the respective amount of (A) (B), (C) used for preparing the polyester with respect to the total amount of monomers used for preparing the polyester.

The polyester used according to the invention may further comprise monomer repeating units from a monohydric alcohol, a dihydric alcohol, a trihydric or higher alcohol, which may be linear or cyclic.

The polyester used according to the invention may further comprise monomer repeating units from an acid compound such as monobasic acids and polybasic acids (aliphatic polybasic acids and aromatic polybasic acids).

Polyester

Preferably, the polyester used according to the invention has a molar ratio of the OH group to the COOH group in the total of (A), (B) and (C) of at least 1.3. This leads to a good compatibility with the radiation-curable composition. Preferably, the molar ratio of the OH group to the COOH group is at most 1.9. In some embodiments, the polyester used according to the invention has a molar ratio of the OH group to the COOH group in the total of (A), (B) and (C) of at most 0.7.

Preferably, the polyester used according to the invention has an acid value of at least 60 mgKOH/g. More preferably, the polyester used according to the invention has an acid value of at least 70 mgKOH/g, at least 80 mgKOH/g, at least 100 mgKOH/g or at least 120 mgKOH/g, determined according to ASTM D465-05(2010).

Such high acid value was found to lead to a good compatibility with other components in the adhesive composition and a good adhesive property.

Preferably, the polyester used according to the invention has an OH value of at least 60 mgKOH/g determined according to ASTM D4274-99. More preferably, the polyester used according to the invention has an OH value of at least 70 mgKOH/g, at least 80 mgKOH/g or at least 90 mgKOH/g, determined according to ASTM D4274-99. Such high OH value was found to lead to a good compatibility with other components in the adhesive composition.

In some preferred embodiments, the polyester has an OH value of at least 70 mgKOH/g determined according to ASTM D4274-99 and the amount of (A) with respect to the total of (A) and (C) is less than 70 wt. %. Such polyester has a particularly good compatibility with other components in the adhesive composition.

In some preferred embodiments, the amount of (A) with respect to the total of (A) and (C) is at least 40 wt % and the amount of (C1) with respect to (C) is at least 50 wt. %. Such polyester has a particularly good adhesive property.

Adhesive Composition

The present invention further provides a radiation-curable adhesive composition comprising or consisting of a tackifier comprising the polyester herein described and a radiation-curable composition.

Preferably, the amount of the tackifier with respect to the total radiation-curable adhesive composition is 0.1 to 50 wt. %, more preferably 1 to 25 wt. %.

The tackifier in the radiation-curable adhesive composition may consist of the polyester or may further comprise one or more compounds known as a tackifier. Preferably, the amount of the polyester with respect to the total radiation-curable adhesive composition is 0.1 to 50 wt %, more preferably 1 to 25 wt. %

Preferably, the amount of the radiation-curable composition with respect to the total radiation-curable adhesive composition is 50 to 99.9 wt. %, more preferably 75 to 99 wt. %.

Radiation-Curable Composition

Suitable examples of the radiation-curable composition are described in US2005/0182150, incorporated herein by reference.

Preferably, the radiation-curable composition comprises an acrylic polymer.

Acrylic polymers include both homopolymers, copolymers, and terpolymers. The copolymers can be random, block or graft.

The acrylic polymer may comprise repeating units from an acrylic monomer selected from the group consisting of methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl(meth)acrylate, lauryl methacrylate, lauryl acrylate, tridecyl acrylate, tridecyl methacrylate, stearyl acrylate, stearyl methacrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetoxypropyl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy)ethylacrylate, 2-phenoxyethyl acrylate, 2-phenoxyethyl methacrylate, isobornyl acrylate, isobornyl methacrylate, caprolactone acrylate, caprolactone methacrylate, benzyl acrylate, benzyl methacrylate, sodium 1-allyloxy-2-hydroylpropyl sulfonate, and mixtures thereof.

An acrylic copolymer may be produced by copolymerizing acrylic monomers with polar copolymerizable monomers. Examples of such polar copolymerizable monomers include cyanoalkyl acrylates, acrylamides, substituted acrylamides, N-vinyl pyrrolidone, N-vinyl caprolactam, acrylonitrile, vinyl chloride, vinylidene chloride and diallyl phthalate. The amount of the polar copolymerizable monomer may e.g. be 0 to 50 wt. %, preferably 1 to 30 wt. %, of the acrylic copolymer. The amount of the acrylic monomer may e.g. be 50 to 100 wt %, preferably 70 to 99 wt. %, of the acrylic copolymer.

Preferably, the amount of the acrylic polymer with respect to the radiation curable composition is at least 75 wt. %, more preferably 80 to 99.9 wt. %, more preferably 90 to 99.5 wt. %.

Other Components in Radiation Curable Composition

The radiation-curable adhesive composition may further comprise a photo-initiator and/or a crosslinking agent.

Examples of suitable photo-initiators include aldehydes, such as benzaldehyde, acetaldehyde, and their substituted derivatives; ketones, such as, acetophenone, benzophenone and their substituted derivatives; quinines, such as, benzoquinones, anthraquinone and their substituted derivatives; thioxanthones, such as, 2-isopropylthioxanthone and 2-dodecylthioxanthone; and certain chromophore-substituted vinyl halomethyl-sym-triazines, such as, 2-4-bis-(trichloromethyl)-6-(3',4'-dimethoxyphenyl)-sym-triazine.

Preferably, the amount of the photo-initiator with respect to the radiation curable composition is 0.05 to 6.0 wt. %, more preferably 0.1 to 2.0 wt. %, more preferably 0.5 to 1.5 wt. %.

Examples of suitable crosslinking agent include substituted triazines such as 2,4-bis(trichloromethyl)-6-p-methoxystyryl-s-triazine and the chromophore-substituted halomethyl-s-triazines disclosed in U.S. Pat. Nos. 4,329,384, and 4,330,590; herein incorporated by reference. Other useful crosslinking agents include multi-functional alkyl acrylate monomers, such as, but not limited to, trimethylolpropane triacrylate, pentaerythritol tetraacrylate, 1,2-ethylene glycol diacrylate, 1,6 hexanediol diacrylate, and 1,12-dodecanediol diacrylate.

Preferably, the amount of the crosslinking agent with respect to the radiation curable composition is 0.05 to 25 wt. %, more preferably 0.1 to 10 wt. %.

Preferably, the radiation-curable composition comprising an acrylic polymer is ultraviolet light reactive, solvent free and has a Tg of at most −32° C. and a viscosity of at most 24000 mPa·s at 120° ° C.

Radiation-curable compositions comprising an acrylic polymer and a photoinitiator are commercially available. Examples of commercially available radiation-curable composition include acResin® produced by BASF, for example acResin® A 204UV.

The radiation-curable composition may further comprise at least one additive selected from the group consisting of reinforcing agents, fire retardants, foaming agents, plasticizers, oils, antioxidants and fillers. The radiation-curable composition is substantially free of colorants.

Article with Adhered Parts

The invention further provides a process for adhering a first part and a second part, comprising contacting the radiation-curable adhesive composition according to the invention with the first part and the second part and curing the radiation-curable adhesive composition by a radiation.

The invention further provides an article comprising a first part and a second part, wherein the first part and the second part are adhered to each other by a process comprising contacting the radiation-curable adhesive composition according to the invention with the first part and the second part and curing the radiation-curable adhesive composition by a radiation.

Preferably, the radiation is selected from ultraviolet light, electron beam, gamma ray and X-ray.

Preferably, the ultraviolet light has an effective ultraviolet wavelength ranging from about 100 nm to about 400 nm, preferably 220 nm to 280 nm, preferably 255 nm.

Preferably, the radiation is electron beam radiation in an amount ranging from about 1 megarads (Mrads) to about 30 Mrads.

Preferably, the first part and/or the second part is made of a material selected from the group consisting of polyethylene terephthalate, biaxially oriented polypropylene, woven fabrics, non-woven fabrics, metals, metal foils, paper, glass, ceramics, and composite materials comprising laminates of one or more of these materials.

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Preparation of Polyester

Examples 1-2

While a nitrogen gas was blown into a four-neck flask equipped with a stirrer, a reflux condenser including a water separator, and a thermometer, Bisphenol A (2,2-bis (4-hydroxyphenyl) propane) (HBA), neopentyl glycol (NPG) and 1,2,3,6-tetrahydrophthalic acid (THPA) were mixed therein to be subjected to dehydration condensation at 230° C. for 6 hours. The weight ratio of HBA, NPG and THPA is shown in Table 1. A polyester was obtained.

Comparative Experiment 3

The process was identical to example 1 except that no HBA was added and the weight ratio of the compounds used was different.

Comparative Experiment 4

The process was identical to example 1 except that phthalic acid was used instead of THPA and the weight ratio of the compounds used was different.

Various properties were measured for the polyesters obtained.

Acid number was determined according to ASTM D465-05(2010).

Hydroxyl number was determined according to ASTM D4274-99.

Compatibility

The polyester obtained and a radiation-curable adhesive composition comprising an acrylic polymer (acResin 204UV) were mixed at a weight ratio of 20:80 at 100° C. The mixture was subsequently cooled to room temperature and its clarity was visually inspected. When it is clear, it is determined that the polyester is compatible with the radiation-curable adhesive composition (indicated with O). When it is not clear, it is determined that the polyester is not compatible with the radiation-curable adhesive composition (indicated with X).

Adhesion Properties

The polyester obtained and a radiation-curable adhesive composition comprising an acrylic polymer (acResin 204UV) were mixed at a weight ratio of 20:80. The mixture was dissolved in ethyl acetate (50% solution).

The solution was coated on a PET substrate and dried in an oven at 110° C. The dried coating weighed 80 g/m$^2$. Strips of 1 inch by 7 inch were made from the coated substrate and were cured with UV-C (74 mJ)

Resistance to shear from a standard surface (Shear to SS) was determined according to FINAT FTM-8.

Loop tack was determined according to FINAT-9.

Peel was determined according to FINAT-1.

TABLE 1

| | Resin | Ex 1 | Ex 2 | CEx 3 | CEx 4 | Foral85 | tackifier free (only acResin) |
|---|---|---|---|---|---|---|---|
| formulation | (A)HBA | 23.5 | 37.0 | 0.0 | 31.9 | | |
| | (B)NPG | 18.0 | 21.1 | 47.0 | 25.7 | | |
| | (C1)THPA | 58.5 | 41.9 | 53.0 | | | |
| | (C2)Phthalic anhydride | | | | 42.4 | | |
| | total | 100.0 | 100.0 | 100.0 | 100.0 | 0.0 | 0.0 |
| Resin property | A•V (mgKOH/g) | 138 | 16 | 17 | 15 | | |
| | OH•V (mgKOH/g) | 14 | 90 | 100 | 102 | | |
| | Compatibility with acResin 204UV | o | o | x | o | o | — |
| Adhesive Performance | Shear to SS | 300 | 359 | — | 3 | 187 | 6 |
| | Looptack to SS | 25 | 29 | — | 5 | 25 | 14 |
| | 90 peel to SS | 29 | 26 | — | 5 | 22 | 8 |

It can be understood that the polyesters according to the invention (Examples 1 and 2) have a good compatibility with an acrylic polymer and have good adhesion properties. The polyester of CEx 3 has a bad compatibility. The polyester of CEx 4 has poor adhesion properties.

The same properties were measured for Foral 85 (glycerol ester of highly hydrogenated wood rosin). The adhesion properties were worse than the polyesters according to the invention.

The same properties were measured for acResin 204UV. The adhesion properties were substantially worse than the polyesters according to the invention.

UV Absorption

UV absorption was measured for polyester 1 and polyester 2 (structures shown below) and Foral 85.

Polyester 1

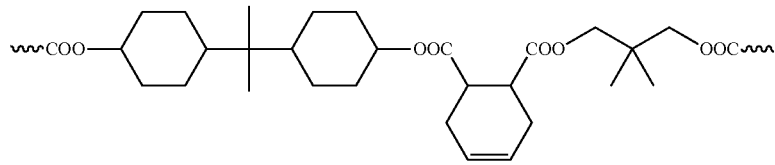

Polyester 2

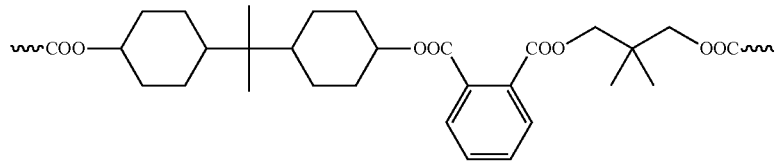

The UV absorption spectrum for polyester 1, polyester 2 and Foral 85 is shown in FIGS. 1(a), 1(b) and 1(c), respectively. It can be understood that polyester 1 according to the invention has a very low absorption in the UV wavelength.

What is claimed is:

1. A use of a polyester comprising monomer repeating units from (A) a hydrogenated bisphenol, (B) a diol, (C) a dicarboxylic acid or its anhydride as a tackifier of an adhesive composition, wherein (C) comprises (C1) an aliphatic dicarboxylic acid or its anhydride.

2. The use according to claim 1, wherein the polyester has an acid value of at least 60 mgKOH/g as determined by ASTM D465-05(2010) and/or an OH value of at 60 mgKOH/g as determined by ASTM D4274-99, wherein the amount of (A) with respect to the total amount of (A) and (C) is 30 to 80 wt. %.

3. The use according to claim 1, wherein the polyester has an acid value of at least 70 mgKOH/g as determined by ASTM D465-05(2010) or
the polyester has an OH value of at least 70 mgKOH/g as determined by ASTM D4274-99 and the amount of (A) with respect to the total of (A) and (B) is less than 70 wt. %.

4. The use according to claim 1, wherein the amount of (A) with respect to the total of (A) and (B) is at least 40 wt. % and the amount of (C1) with respect to (C) is at least 50 wt. %.

5. The use according to claim 1, wherein the polyester has an acid value of at least 70 mgKOH/g or the amount of (A) with respect to the total of (A) and (B) is 40 to 70 wt. % and the amount of (C1) with respect to (C) is at least 50 wt. %.

6. The use according to claim 1, wherein the amount of (A) in the polyester is 10 to 50 wt. % with respect to the polyester, the amount of (B) in the polyester is 10 to 50 wt. % with respect to the polyester and the amount of (C) in the polyester is 20 to 60 wt. %,
wherein the amount of (C1) with respect to (C) is at least 50 wt. %, wherein the total amount of (A), (B) and (C) with respect to the polyester is at least 90 wt. %.

7. The use according to claim 1, wherein (A) is selected from the group consisting of hydrides of
Bisphenol A (2,2-bis(4-hydroxyphenyl)propane), Bisphenol F (bis(hydroxyphenyl)methane), Bisphenol E (2,2-bis(4-hydroxyphenyl)ethane), Bisphenol B (2,2-bis(4-hydroxyphenyl) butane), Bisphenol S (bis(4-hydroxyphenyl)sulfone), 2,2-bis(4-hydroxyphenyl)-4-methylpentane, 1,1-bis(4-hydroxyphenyl)-2-methylpropane, bis(4-hydroxyphenyl)phenylmethane, bis(4-hydroxy-3,5-dimethylphenyl)methane, 1,1-bis(4-hydroxy-3,5-dimethylphenyl)ethane, 2,2-bis(4-hydroxy-3,5-dimethylphenyl)propane, 2,2-bis(4-hydroxy-3,5-dimethylphenyl)butane, 2,2-bis(4-hydroxy-3-methylphenyl)butane, 1,1-bis(4-hydroxy-3-methylphenyl)-2-phenylethane, Biphenol, bis(4-hydroxyphenyl)ether and bis(4-hydroxyphenyl)ketone.

8. The use according to claim 1, wherein (B) is a diol having a branched alkyl group or an ether group.

9. The use according to claim 1, wherein (C1) contains a cyclohexene or cyclohexane structure.

10. A radiation-curable adhesive composition, comprising: a tackifier and a radiation-curable composition, wherein the tackifier comprises or is a polyester comprising monomer repeating units from (A) a hydrogenated bisphenol, (B) a diol having a branched alkyl group or an ether group and (C) a dicarboxylic acid or its anhydride, wherein (C) comprises (C1) an aliphatic dicarboxylic acid or its anhydride.

11. The radiation-curable adhesive composition according to claim 10, wherein the amount of the tackifier with respect to the total radiation-curable adhesive composition is 0.1 to 50 wt. %, and the amount of the radiation-curable composition with respect to the total radiation-curable adhesive composition is 50 to 99.9 wt. %.

12. The radiation-curable adhesive composition according to claim 10, wherein the radiation-curable composition comprises an acrylic polymer and a photo-initiator and/or a crosslinking agent, wherein the radiation-curable adhesive composition comprises at most 0.1 wt. % or 0 wt. % of colorants.

13. The radiation-curable adhesive composition according to claim 10, wherein the radiation-curable adhesive composition has a luminous transmission of at least 80% and a haze of at most 5% in the wavelength range of 400 to 700 nm determined by ASTM-D 1003-95.

14. A process for adhering a first part and a second part, comprising contacting the radiation-curable adhesive composition according to claim 10 with the first part and the second part and curing the radiation-curable adhesive composition by a radiation, wherein the radiation is selected from ultraviolet light, electron beam, gamma ray and X-ray.

15. An article comprising a first part and a second part, wherein the first part and the second part are adhered to each other by a process comprising contacting the radiation-curable adhesive composition according to claim 10 with the first part and the second part and curing the radiation-curable adhesive composition by a radiation, wherein the radiation is selected from ultraviolet light, electron beam, gamma ray and X-ray.

16. The radiation-curable adhesive composition according to claim 11, wherein the radiation-curable composition comprises an acrylic polymer and further a photo-initiator and/or a crosslinking agent, wherein the radiation-curable adhesive composition comprises at most 0.1 wt. % or 0 wt. % of colorants.

17. The radiation-curable adhesive composition according to claim 16, wherein the radiation-curable adhesive composition has a luminous transmission of at least 80% and a haze of at most 5% in the wavelength range of 400 to 700 nm determined by ASTM-D 1003-95.

18. A process for adhering a first part and a second part, comprising contacting the radiation-curable adhesive composition according to claim 17 with the first part and the second part and curing the radiation-curable adhesive composition by a radiation, wherein the radiation is selected from ultraviolet light, electron beam, gamma ray and X-ray.

19. An article comprising a first part and a second part, wherein the first part and the second part are adhered to each other by a process comprising contacting the radiation-curable adhesive composition according to claim 18 with the first part and the second part and curing the radiation-curable adhesive composition by a radiation, wherein the radiation is selected from ultraviolet light, electron beam, gamma ray and X-ray.

20. The use according to claim 8, wherein (B) is selected from the group consisting of 2,2-dimethylpropane-1,3-diol, 2-methyl-2,4-pentanediol, 3-methyl-1,5-pentanediol, 2-methyl-2-propyl-1,3-propanediol, 2,4-dimethyl-2,4-dimethylpentanediol, 2,2-diethyl-1,3-propanediol, 2,2,4-trimethyl-1,3-pentanediol, dimethylol octane, 2-ethyl-1,3-hexanediol, 2,5-diol-2,5-hexanediol, 2-methyl-1,8-octanediol, 2-butyl-2-ethyl-1,3-propanediol and 2,4-diethyl-1,5-pentanediol, polyethylene glycol (n=1 to 20), polypropylene glycol (n=1 to 20), polytetramethylene glycol (n=1 to 20), and polyester polyol.

21. The use according to claim 9, wherein (C1) is selected from the group consisting of 1,2,3,6-tetrahydrophthalic acid, 3-methyl-1,2,3,6-tetrahydrophthalic acid, 4-methyl-1,2,3,6-tetrahydrophthalic acid, hexahydrophthalic acid, 3-methylhexahydrophthalic acid and 4-methylhexahydrophthalic acid and their anhydrides, and 1,2,3,6-tetrahydrophthalic acid.

* * * * *